(12) United States Patent
Ito (10) Patent No.: US 8,320,343 B2
(45) Date of Patent: Nov. 27, 2012

(54) RADIO CELL STATION APPARATUS, REFERENCE SIGNAL ALLOCATION METHOD AND REFERENCE SIGNAL ALLOCATION PROGRAM

(75) Inventor: Tadayoshi Ito, Hashima (JP)

(73) Assignee: Kyocera Corporation, Kyoto-shi (JP)

( * ) Notice: Subject to any disclaimer, the term of this patent is extended or adjusted under 35 U.S.C. 154(b) by 859 days.

(21) Appl. No.: 10/528,019

(22) PCT Filed: Sep. 18, 2003

(86) PCT No.: PCT/JP03/11945
§ 371 (c)(1),
(2), (4) Date: Mar. 16, 2005

(87) PCT Pub. No.: WO2004/028194
PCT Pub. Date: Apr. 1, 2004

(65) Prior Publication Data
US 2006/0072535 A1    Apr. 6, 2006

(30) Foreign Application Priority Data
Sep. 20, 2002  (JP) ................................ 2002-274640

(51) Int. Cl.
*H04B 7/212* (2006.01)
(52) U.S. Cl. ......... 370/337; 370/321; 370/347; 370/442
(58) Field of Classification Search .................. 370/337, 370/321, 347, 442
See application file for complete search history.

(56) References Cited

U.S. PATENT DOCUMENTS

| 4,672,447 | A | * | 6/1987 | Moring et al. | 348/537 |
| 4,689,664 | A | * | 8/1987 | Moring et al. | 348/639 |
| 5,369,683 | A | * | 11/1994 | Yabe et al. | 455/455 |
| 5,745,316 | A | * | 4/1998 | Schandl | 360/70 |
| 5,966,095 | A | * | 10/1999 | Hiramatsu et al. | 342/383 |
| 6,177,906 | B1 | * | 1/2001 | Petrus | 342/378 |
| 6,178,329 | B1 | * | 1/2001 | Chao et al. | 455/452.1 |
| 6,282,422 | B1 | * | 8/2001 | Aikawa et al. | 455/436 |
| 6,373,833 | B1 | * | 4/2002 | Suonvieri et al. | 370/347 |
| 6,385,174 | B1 | * | 5/2002 | Li | 370/252 |
| 6,438,254 | B1 | * | 8/2002 | Kadono et al. | 382/107 |
| 6,580,913 | B1 | * | 6/2003 | Chao et al. | 455/452.1 |
| 6,667,962 | B1 | * | 12/2003 | Lee et al. | 370/335 |
| 6,826,386 | B2 | * | 11/2004 | Doi | 455/25 |
| 6,859,831 | B1 | * | 2/2005 | Gelvin et al. | 709/224 |
| 7,020,492 | B2 | * | 3/2006 | Doi et al. | 455/562.1 |
| 7,062,294 | B1 | * | 6/2006 | Rogard et al. | 455/562.1 |
| 7,283,904 | B2 | * | 10/2007 | Benjamin et al. | 701/117 |
| 7,292,548 | B2 | * | 11/2007 | Lim et al. | 370/328 |

(Continued)

FOREIGN PATENT DOCUMENTS

EP    1 041 839 A2    10/2000

(Continued)

*Primary Examiner* — Matthew Sams
*Assistant Examiner* — Diego Herrera
(74) *Attorney, Agent, or Firm* — Foley & Lardner LLP (57) ABSTRACT

A CS searches in advance for information about unique words used by neighboring CSs to hold the information in a storage unit. When an LCH establishment request is made by a PS in the cell of the CS, it is confirmed whether or not there is an empty traffic slot. Further, with reference to the unique word information of the neighboring CSs of the same frequency and the same slot as the empty slot to be allocated, an unused unique word pattern is allocated.

4 Claims, 9 Drawing Sheets

U.S. PATENT DOCUMENTS

| | | | |
|---|---|---|---|
| 7,301,926 B1 * | 11/2007 | Dietrich et al. | 370/338 |
| 7,423,961 B2 * | 9/2008 | Ogawa et al. | 370/210 |
| 7,426,673 B2 * | 9/2008 | Kumaki | 714/758 |
| 2001/0019952 A1 * | 9/2001 | Ishida | 455/414 |
| 2002/0039886 A1 * | 4/2002 | Doi | 455/25 |
| 2002/0157024 A1 * | 10/2002 | Yokote | 713/201 |
| 2003/0139202 A1 * | 7/2003 | Doi et al. | 455/562 |
| 2003/0202541 A1 * | 10/2003 | Lim et al. | 370/503 |
| 2004/0246889 A1 * | 12/2004 | Ogawa et al. | 370/210 |

FOREIGN PATENT DOCUMENTS

| | | |
|---|---|---|
| EP | 1225706 A1 * | 7/2002 |
| EP | 1443680 A1 * | 8/2004 |
| JP | 9-9342 A | 1/1997 |
| JP | 2000-278740 A | 10/2000 |
| JP | 2001-128230 A | 5/2001 |
| JP | 2001-231072 A | 8/2001 |
| JP | 2001-285931 A | 10/2001 |
| WO | WO 02/07344 A1 | 1/2002 |

* cited by examiner

| SLOT NUMBER | FREQUENCY | UW IN USE | UW IN USE | UW IN USE | UW IN USE |
|---|---|---|---|---|---|
| 1 | 30ch | 8 | | | |
| | 31ch | 1 | | | |
| | 32ch | 2 | 3 | | |
| | 33ch | 1 | | | |
| | ... | | | | |
| 2 | | | | | |
| 3 | | | | | |
| 4 | | | | | |

FIG.3

| UW NUMBER | UW16 UP-link | UW16 DOWN-link | UW32 UP-link | UW32 DOWN-link |
|---|---|---|---|---|
| 1 | 8001h | 7fffh | 11111111h | 88888888h |
| 2 | | | | |
| 3 | | | | |
| 4 | | | | |
| 5 | | | | |
| ... | | | | |

RADIO CELL STATION APPARATUS, REFERENCE SIGNAL ALLOCATION METHOD AND REFERENCE SIGNAL ALLOCATION PROGRAM

Japan Priority Application 2002-274640, filed Sep. 20, 2002 including the specification, drawings, claims and abstract, is incorporated herein by reference in its entirety. This application is a National Stage of US Application PCT/JP03/11945, filed Sep. 18, 2003, incorporated herein by reference in its entirety.

TECHNICAL FIELD

The present invention relates to a radio cell station apparatus, a reference signal allocation method and a reference signal allocation program in a mobile communication system, and more particularly to a radio cell station apparatus, a reference signal allocation method and a reference signal allocation program for allocating a reference signal to a terminal device that makes a connection request.

BACKGROUND ART

Recently, in a rapidly-developing mobile communication system, for an improvement of efficiency in use of radio wave frequencies, various multiple access systems have been proposed that allow a plurality of users to share a radio transmission path and conduct communications simultaneously, and are now partially in practical use.

For example, PHS (Personal Handyphone System) generally employs, as a method of splitting a transmission channel, TDMA (Time Division Multiple Access) that divides a radio channel with respect to time.

The TDMA system transmits respective digitized signals of users by radio waves at different frequencies in separate and certain time periods (time slots), and separates respective signals of the users by frequency filters as well as time synchronization between a base station and respective mobile terminal devices of the users.

Further, for a further improvement of efficiency in use of radio wave frequencies, SDMA (Space Division Multiple Access) system in which a single time slot of a single frequency is spatially divided to transmit data of a plurality of users has been proposed.

In both of the TDMA system and the SDMA system, a time period (1 frame) using one frequency is divided into several time slots so as to allow each user to use different time slot. Accordingly, time-position control (burst synchronization control) for accurately transmitting signals to allocated time slots in order to avoid overlapping of the signal with other user's transmission is required at the time of transmission.

In the PHS, synchronous position detection utilizing what is called correlation synchronization has conventionally been known as a method of locating a synchronous position of a signal received from a personal station (hereinafter, referred to as "PS") in a cell station (hereinafter, referred to as "CS").

According to the synchronous position detection utilizing the correlation synchronization, a time-position at which a correlation value attains a peak is specified as the synchronous position in the following manner. Specifically, in view of the fact that a reception signal from a PS includes in each frame a reference signal (a unique word signal: UW signal) section consisting of an already-known bit string common to all users, a CS calculates correlation of an already-known waveform of the reference signal stored in a memory in advance and a waveform section cut out while shifting the waveform of a reception signal from the PS having a prescribed length.

The above-described correlation synchronization, however, is based on the premise that the CS receives a signal from a single PS, and it is not adapted to a case in which the CS receives signals of the same frequency from two PSs in an overlapped manner.

In the SDMA in particular, a single time slot of the same frequency is spatially divided and resultant channels are allocated to a plurality of PSs. Therefore, it is highly likely that two signals of the same frequency arrive at the CS in an overlapped manner.

If synchronous positions of the reception signals from the PSs of the plurality of users coincide with one another, reference signal sections of the reception signals overlap with one another and the users cannot be identified or separated from one another, resulting in interference among the users.

In any systems other than the SDMA system as well, a CS in a certain cell could receive from a desired PS a signal of a certain frequency on which an unnecessary interference wave of the same frequency of another PS connected to a CS in a different cell overlaps.

The aforementioned event is likely to occur in a traffic-busy region like urban area in which CSs are densely placed. Since the synchronous position of the signal received from the desired PS cannot be specified, interference also occurs between users in different cells, resulting in deterioration in communication quality.

In order to solve the problem above, control such as forming a directivity pattern in accordance with a direction of the PS by means of an adaptive array apparatus or slightly shifting a signal transmission time for each of the plurality of PSs establishing space division multiple access has been carried out so far in the CS of the SDMA system.

In addition, recently, Japanese Patent Laying-Open No. 2001-231072, for example, has proposed a measure to prevent mutual interference among a plurality of users by appropriately separating and extracting communication data of each mobile station by designating and using different reference signal for each PS in the CS.

Here, an operation for controlling allocation of a reference signal performed by the conventional CS on each PS will be described with reference to FIG. 9.

Figure 9:
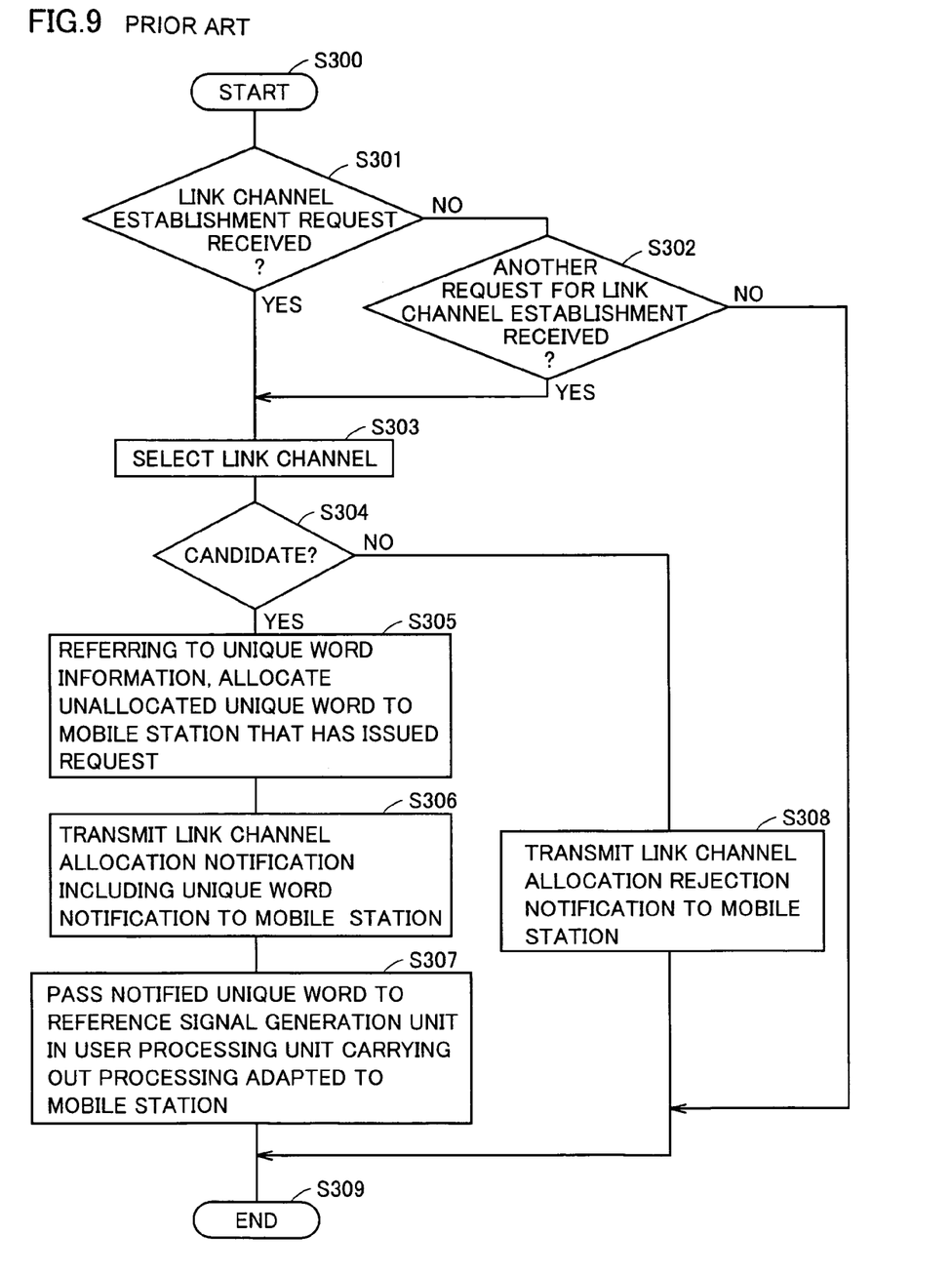
FIG. 9 is a flowchart illustrating an operation performed by a control unit of a conventional CS when a link channel establishment request is received from a PS.

FIG. 9 is a flowchart illustrating an operation performed by a control unit within the CS when a link channel establishment request is received from the PS for initiating a call or data communication.

It is noted that, as the precondition for the operation in FIG. 9, a reference signal is stored as unique word information in advance in a unique word storage unit within the CS in a fixed manner.

The unique word information represents information obtained by associating a unique word value with information indicating a status that the unique word has been allocated. The unique word takes a 16-bit value such as "0011110101000110" expressed as a binary number, or a 32-bit value. In addition, the unique word takes a value specifying a PS such as user 1, user 2 and so on as a value indicating a status that the unique word has been allocated, or a value indicating that the unique word has not yet been allocated.

Referring to FIG. 9, initially, when a link channel establishment request is received from the PS (step S301) or when a link channel reestablishment request is received (step S302), a control unit searches for a channel available for allocation to the PS (step S303).

If there is no channel available for allocation (step S304), control such that a link channel allocation rejection notification is transmitted to the PS is exerted (step S308).

On the other hand, if there is a channel available for allocation (step S304), referring to the unique word held in the unique word storage unit, the control unit determines that an unallocated unique word is to be allocated to the PS and updates the unique word information so as to associate the unique word with the PS (step S305).

In addition, the control unit transmits to the PS a link channel allocation notification including notification of the determined, one unique word (step S306).

Furthermore, the control unit provides a value of the unique word included in the notification, to a reference signal generation unit in a user processing unit that carries out processing adapted to the PS (step S307).

Thus, the conventional CS can determine the reference signal based on the unique word value and appropriately direct, based on the reference signal and a reception signal, a directivity pattern to the PS. Accordingly, interference with other PSs can be avoided and communication can be conducted with the PS in the SDMA system while communication quality is retained.

The conventional CSs heretofore discussed are all techniques specific to SDMA to prevent mutual interference between a plurality of users in a cell and thereby retain certain communication quality.

There still remains a problem, however, that the conventional CSs do not sufficiently address the problem of interference with users in another cell.

For example, as shown in FIG. 9, even when the CS designates different unique words for respective PSs in the cell, a unique word designated for one PS is not the one that is designated in consideration of any PSs in other cells. Therefore, in a certain time slot, the designated unique word could be identical to a unique word designated for a PS in another cell. In this case, although interference with other PSs in the same cell can be avoided, interference with any PSs in other cells could still occur.

It is noted that the above-described situation is not peculiar to the SDMA system and could occur as well to the TDMA system.

An object of the present invention is therefore to provide a radio cell station apparatus, a reference signal allocation method and a reference signal allocation program that can avoid mutual interference between PSs in adjacent cells and thereby prevent deterioration in communication quality.

DISCLOSURE OF THE INVENTION

According to an aspect of the present invention, a radio cell station apparatus in a mobile communication system is provided and signals received in the mobile communication system include already-known reference signals. The radio cell station apparatus includes: search means for searching for a reference signal already used in a neighboring cell station; storage means for storing the reference signal detected by the search means; and reference signal allocation means for allocating, when a connection request is received from a terminal device, a reference signal different from the reference signal stored in the storage means.

Preferably, before the connection request is received from the terminal device, the search means receives in advance a communication signal communicated between a neighboring cell station and a terminal device communicating with the neighboring cell station, and analyzes a reference signal in use from the received communication signal, and the storage means stores and holds the analyzed reference signal.

More preferably, the search means searches for the reference signal used in the neighboring cell station for each traffic slot allocated to the terminal device.

According to another aspect of the present invention, a radio cell station apparatus in a mobile communication system is provided and signals transmitted/received in the mobile communication system include already-known reference signals. The radio cell station apparatus includes: storage means for storing a plurality of reference signals different from each other; and reference signal allocation means for randomly selecting, when a connection request is received from a terminal device, a reference signal from the storage means based on a cell station number assigned to each cell station and allocating the reference signal to the terminal device.

Preferably, the reference signal allocation means allocates an i-th reference signal corresponding to value i of a remainder of division of the cell station number by total number m of reference signals stored in the storage means, where m is a natural number and i is a natural number of at most m.

According to still another aspect of the present invention, a reference signal allocation method performed by a radio cell station apparatus in a mobile communication system is provided and signals received in the mobile communication system include already-known reference signals. The reference signal allocation method includes the steps of: searching for a reference signal already used in a neighboring cell station; storing the reference signal detected; and allocating, when a connection request is received from a terminal device, a reference signal different from the reference signal stored.

Preferably, the method further includes the steps of: before the connection request is received from the terminal device, receiving in advance a communication signal communicated between a neighboring cell station and a terminal device communicating with the neighboring cell station, and analyzing a reference signal in use from the received communication signal; and storing the analyzed reference signal.

More preferably, the method further includes the step of searching for the reference signal used in the neighboring cell station for each traffic slot allocated to the terminal device.

According to a further aspect of the present invention, a reference signal allocation method performed by a radio cell station apparatus in a mobile communication system is provided and signals transmitted/received in the mobile communication system include already-known reference signals. The method includes the steps of: storing a plurality of reference signals different from each other; and randomly selecting, when a connection request is received from a terminal device, a reference signal from the plurality of reference signals based on a cell station number assigned to each cell station and allocating the reference signal to the terminal device.

More preferably, the method further includes the step of allocating an i-th reference signal corresponding to value i of a remainder of division of the cell station number by total number m of the reference signals stored, where m is a natural number and i is a natural number of at most m.

According to a further aspect of the present invention, a reference signal allocation program performed by a radio cell station apparatus in a mobile communication system is provided, signals received in the mobile communication system include already-known reference signals, and the program is performed for a computer to execute the steps of: searching for a reference signal already used in a neighboring cell station; storing the reference signal detected; and allocating, when a connection request is received from a terminal device, a reference signal different from the reference signal stored.

Preferably, the program is performed for the computer to further execute the steps of: before the connection request is received from the terminal device, receiving in advance a communication signal communicated between a neighboring cell station and a terminal device communicating with the neighboring cell station, and analyzing a reference signal in use from the received communication signal; and storing the analyzed reference signal.

More preferably, the program is performed for the computer to further execute the step of searching for the reference signal used in the neighboring cell station for each traffic slot allocated to the terminal device.

According to a further aspect of the present invention, a reference signal allocation program performed by a radio cell station apparatus in a mobile communication system is provided, signals transmitted/received in the mobile communication system include already-known reference signals, and the program is performed for a computer to execute the steps of: storing a plurality of reference signals different from each other; and randomly selecting, when a connection request is received from a terminal device, a reference signal from the plurality of reference signals based on a cell station number assigned to each cell station and allocating the reference signal to the terminal device.

Preferably, the program is performed for the computer to further execute the step of allocating an i-th reference signal corresponding to value i of a remainder of division of the cell station number by total number m of the reference signals stored, where m is a natural number and i is a natural number of at most m.

Thus, in accordance with the present invention, deterioration in quality of call and interference between users that are caused by mutual interference between PSs in adjacent cells can be prevented.

BEST MODES FOR CARRYING OUT THE INVENTION

Embodiments of the present invention will be described in detail hereinafter with reference to the drawings. The same or corresponding elements have the same reference characters allotted.

First Embodiment

Figure 1:
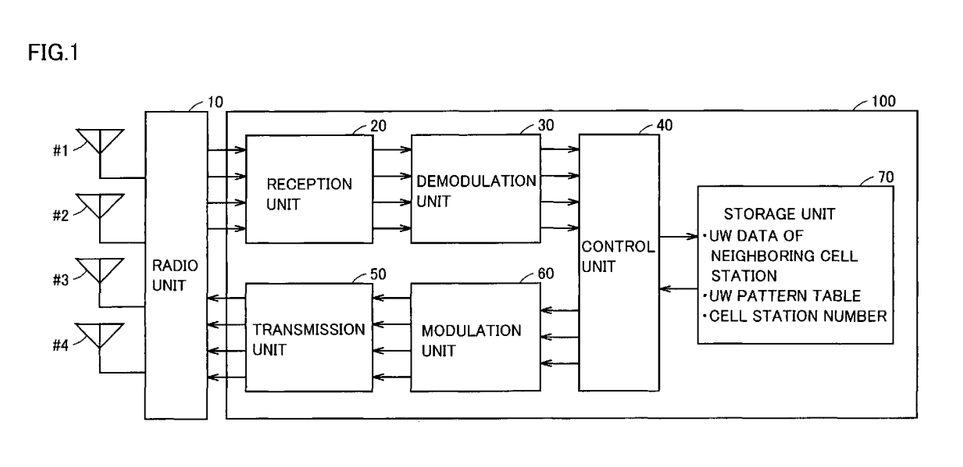
FIG. 1 is a schematic block diagram showing a configuration of a radio cell station according to a first embodiment of the present invention.

FIG. 1 is a schematic block diagram showing a configuration of a radio cell station according to a first embodiment of the present invention.

Referring to FIG. 1, the radio cell station apparatus includes a radio unit 10, a plurality of antennas (four antennas of antennas #1 to #4, for example), a reception unit 20, a demodulation unit 30, a control unit 40, a demodulation unit 30, a transmission unit 50, a modulation unit 60, and a storage unit 70.

Antennas #1 to #4 are connected to radio unit 10.

In reception, signals received by antennas #1 to #4 are provided to reception unit 20 through radio unit 10. The reception signals provided to reception unit 20 are subjected to various types of analog signal processing such as amplification and frequency conversion, and converted to digital signals by an A/D converter (not shown). In addition, reception unit 20 separates and extracts a signal of each user under the control of control unit 40. The separated and extracted reception signal of each user is provided to demodulation unit 30, and subjected to necessary demodulation processing and time-division processing. The original signal is thus recovered and output to public switched telephone network (not shown) through control unit 40.

On the other hand, in transmission, a transmission signal provided from the public switched telephone network (not shown) is provided to modulation unit 60 through control unit 40, subjected to necessary time-division processing and modulation processing, and provided to transmission unit 50. In transmission unit 50, the transmission signal is converted to an analog signal by a D/A converter (not shown) and subjected to various types of analog signal processing such as amplification and frequency conversion necessary for radio transmission.

In transmission, a signal from transmission unit 50 is supplied to antennas #1 to #4 through radio unit 10, and transmitted to a desired PS from antennas #1 to #4.

Specifically, control unit 40 is implemented by a CPU, and controls the entire CS. In particular, control unit 40 allocates a channel to the PS when control unit 40 receives a call from the PS through a control channel and when it receives an incoming call through the public switched telephone network (not shown).

Specifically, storage unit 70 is implemented by a memory that holds, as hereinlater described, information about unique words used by neighboring CSs as well as information about a unique word pattern table and cell station numbers, and holds and reads the above-described information according to instructions from control unit 40.

Figure 2:
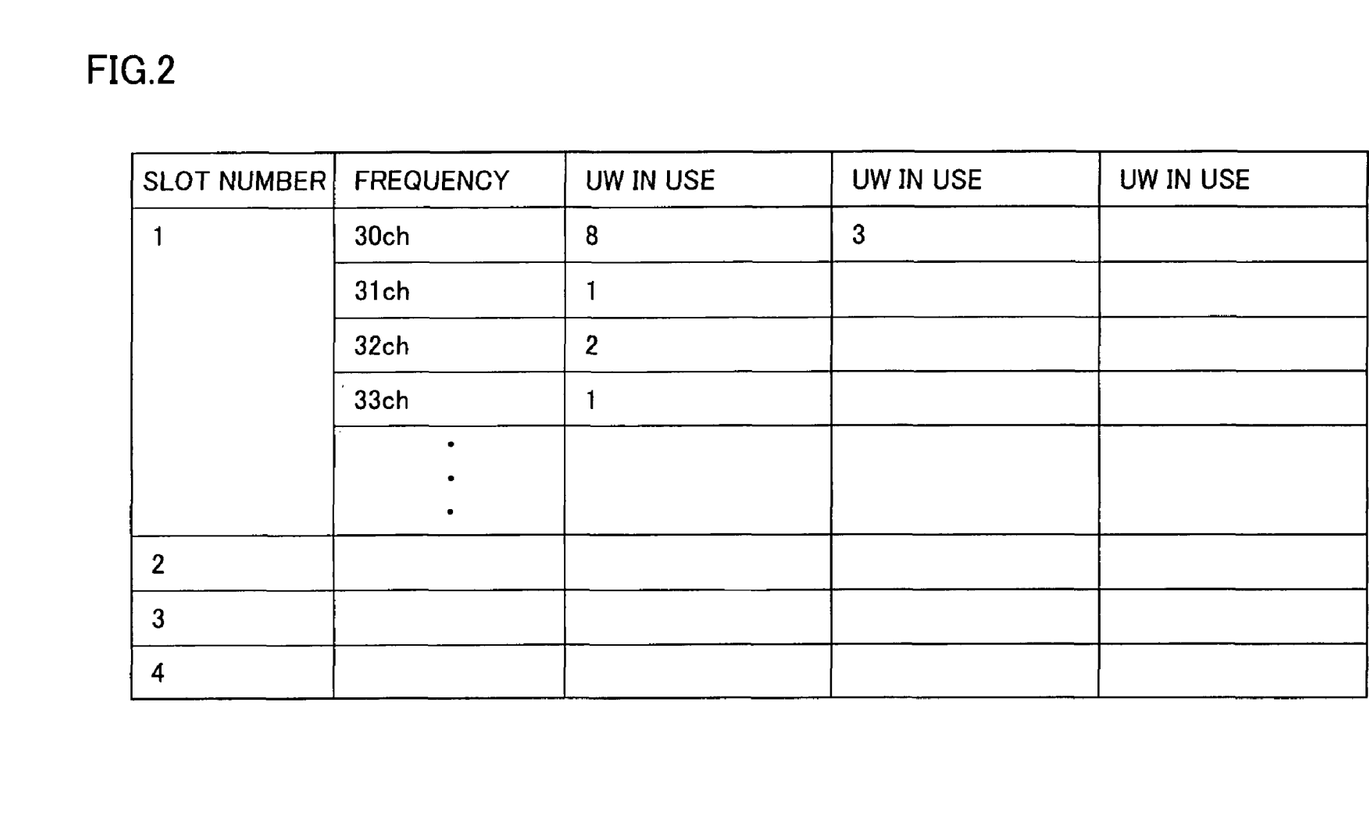
FIG. 2 is a schematic diagram illustrating information about unique words used by neighboring CSs that are held in storage unit 70 in FIG. 1.

FIG. 2 is a schematic diagram illustrating information about unique words used by neighboring CSs that are stored and held in storage unit 70 in FIG. 1.

Referring to FIG. 2, in storage unit 70, for each of a plurality of time slots from which one frame is composed, data concerning unique words used by neighboring CSs in the same time slot is stored.

For example, for the time slot corresponding to slot number 1, information about unique words used by neighboring CSs is searched for and held for each of channels corresponding to frequencies available to the CSs.

Here, the unique word information is searched for, before reception of a link channel establishment request from a PS, by control unit 40 of the CS. Control unit 40 receives traffic channel signals that are transmitted by using empty slots to PSs in the cell from the neighboring CSs, and detects unique words included in the signals. Further, control unit 40 receives traffic channel signals that are transmitted to the CS in the cell from PSs in the neighboring CSs, and detects unique words included in the signals. To the detected unique words, unique word numbers different from each other are assigned and the unique words are held in storage unit 70.

Referring to FIG. 2, specifically, for a frequency in use, 30 ch, in the time slot of slot number 1, unique words corresponding to unique word numbers 8 and 3 are detected from traffic channel signals from neighboring CSs.

Further, it is seen that, for the frequency of channel 31 ch, unique word number 1 is used and, for the frequency of 32 ch, unique word number 2 is used.

Figure 3:
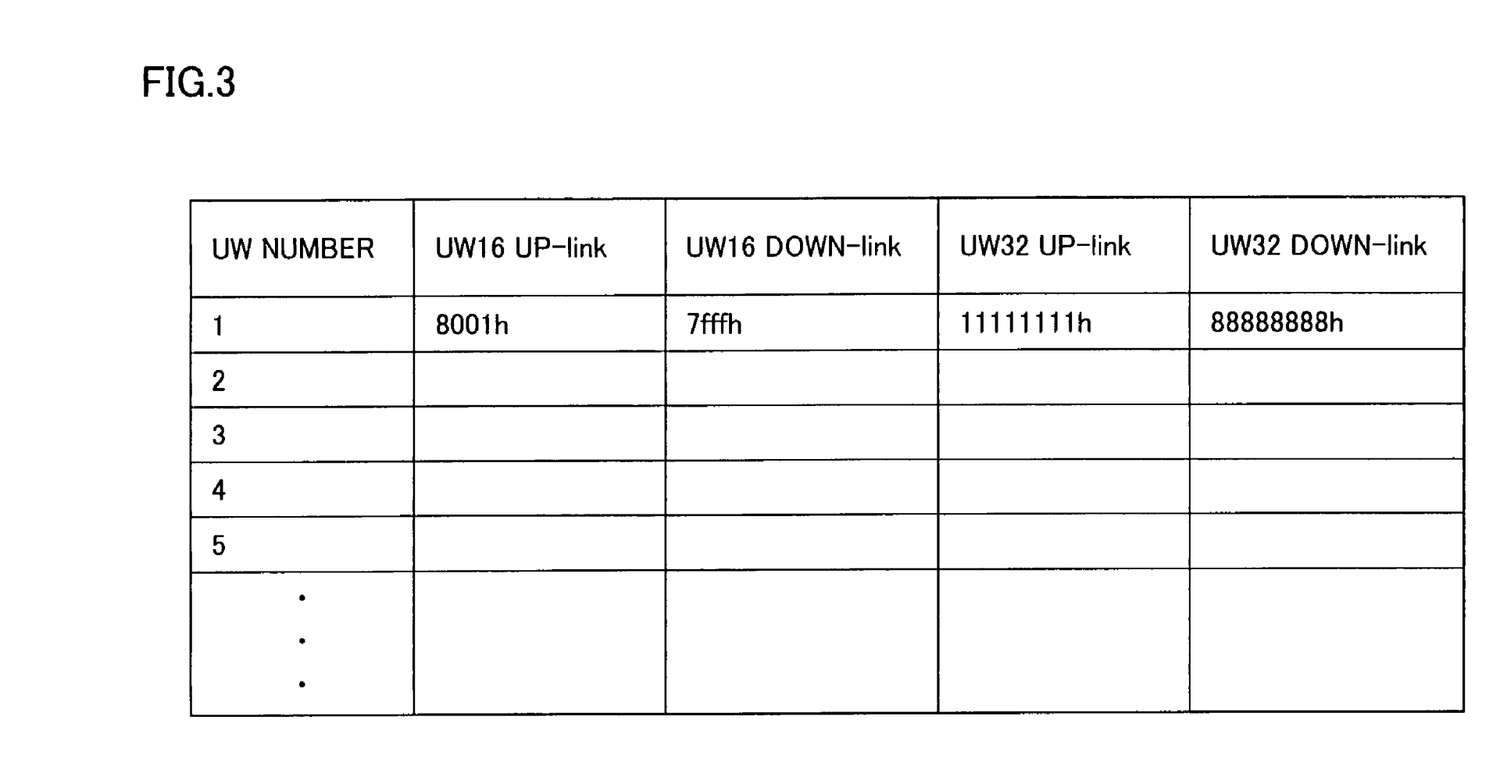
FIG. 3 shows a table of unique word numbers and their associated unique word patterns.

FIG. 3 shows a table of unique word numbers and their associated unique word patterns. The table of the unique word patterns is held, as the unique word information of neighboring CSs as discussed above, in storage unit 70 within the CS in advance.

Referring to FIG. 3, each unique word pattern that is stored for one unique word number is constituted of a total of four patterns: a pattern for uplink consisting of 16 bits; a pattern for downlink consisting of 16 bits; a pattern for uplink consisting of 32 bits; and a pattern for downlink consisting of 32 bits.

This is because both of the uplink and the downlink of a channel between the CS and the PS consist of a signal control channel (hereinafter, referred to as SCCH) for transmitting information necessary for connecting a call and a traffic channel (hereinafter, referred to as TCH) used for communication, and because the SCCH and the TCH include unique words consisting of 32 bits and 16 bits respectively.

For example, regarding unique word number 1, unique word pattern "8001h" is stored for the uplink of 16 bits. It is noted that this pattern is a hexadecimal notation of the 16-bit unique word pattern in binary notation and the last character "h" means that this pattern is in hexadecimal notation.

Similarly, for the downlink of 16 bits, the uplink of 32 bits and the downlink of 32 bits, "7fffh", "11111111h" and "88888888h" are stored respectively.

Regarding unique word number 2 and subsequent unique word numbers as well, a set of four unique word patterns is stored for one unique word number (not shown).

Therefore, referring again to FIG. 2 showing the unique word information of the neighboring CSs, regarding the frequency in use of channel 31 ch of slot number 1 for example, the unique word pattern of unique word number 1 has already been used. Then, in light of the table in FIG. 3, it can be determined that the unique words of the aforementioned four patterns are used.

Next, a method of allocating unique words by the radio cell station apparatus of the first embodiment having the above-described configuration is described in connection with FIG. 4.

Figure 4:
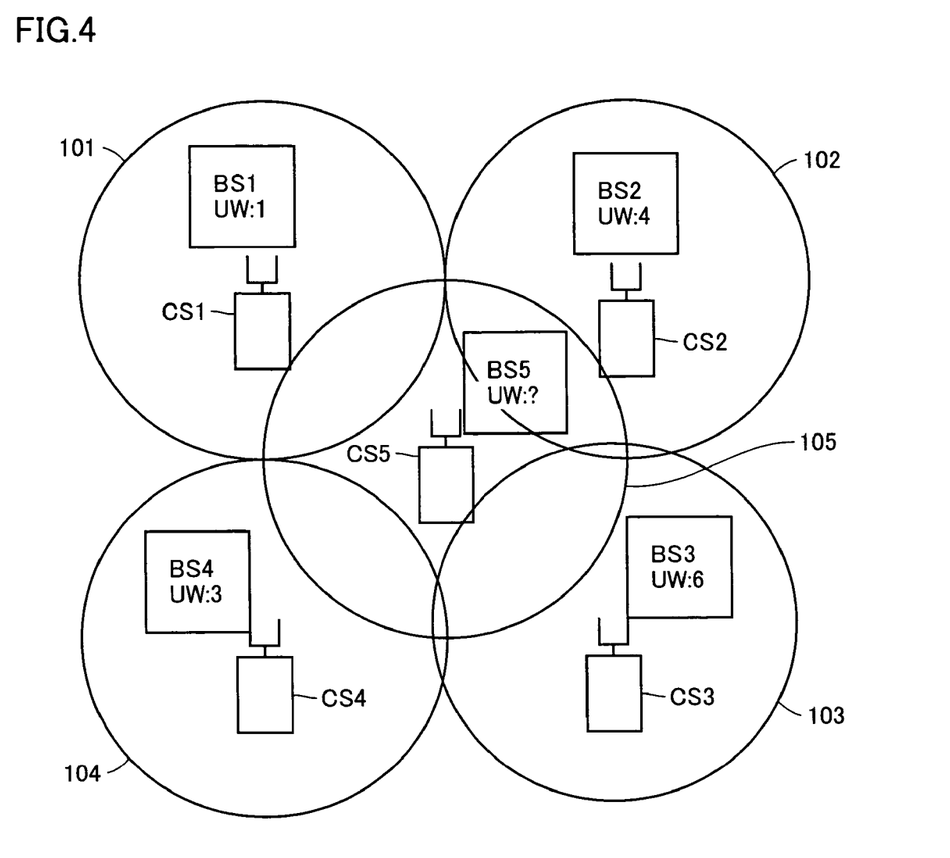
FIG. 4 schematically shows a form in which a plurality of PSs are connected for each of CSs.

FIG. 4 schematically shows a form in which a plurality of PSs are connected for each of CSs.

Referring to FIG. 4, radio waves from each of CSs (CS1 to CS5 for example) are receivable within the boundary of the region indicated by each of concentric circles (101 to 105 for example) having the CS at the center. In circles 101 to 105 each, a plurality of user PSs (not shown) are located and connected at a predetermined frequency of the CS in respective time slots.

Here, in an urban area for example where cell stations are densely placed, as shown in FIG. 4, regions 101 to 105 where radio waves from respective CS1 to CS5 adjacent to each other are receivable overlap each other. Therefore, a transmission signal from a PS in any portion where adjacent regions overlap reaches both of respective CSs in the regions.

Here, for CS1 to CS4 each, a unique word is designated that is common to a plurality of user PSs in the cell. For example, to CS1, a unique word associated with unique word number 1 is provided.

It is supposed here that CS5 in FIG. 4 receives a link channel (LCH) allocation request from a user PS that requests connection. Then, it is determined whether or not there is an empty slot. If it is found that the cell station has an unused empty time slot, a link channel in the empty time slot is selected for the PS making the connection request.

Usually, to the empty time slot, other user PSs are not connected. Therefore, basically there arises no interference of radio waves, the link channel is effectively selected and the allocation of the link channel to the PS is established.

If a unique word included in the allocated transmission channel is the same as any unique word that has already been used by adjacent CS1 to CS4, however, interference with radio waves from user PSs and CSs in other cells could occur in the time slot to cause interference between users in different cells.

Accordingly, when the PS is to be allocated to an empty transmission channel in a certain time slot, it is necessary to confirm that no interference occurs with radio waves from any user PSs that have already been connected to adjacent CSs in the time slot.

In this case, therefore, CS5 refers to unique word patterns of neighboring cell stations CS1 to CS4 stored in advance in storage unit 70 in FIG. 1, selects and assigns a unique word pattern that is not used in the time slot, thereby avoiding interference with any PSs in other cells.

Specifically, since adjacent four cell stations CS1 to CS4 have already used unique word patterns associated with unique word numbers 1, 3, 4 and 6, CS5 in FIG. 4 selects and allocates a unique word associated with an unused unique word number (5 for example).

Thus, interference with PSs in other cells connected to the same time slot is avoided and deterioration in communication quality can be prevented.

Figure 5:
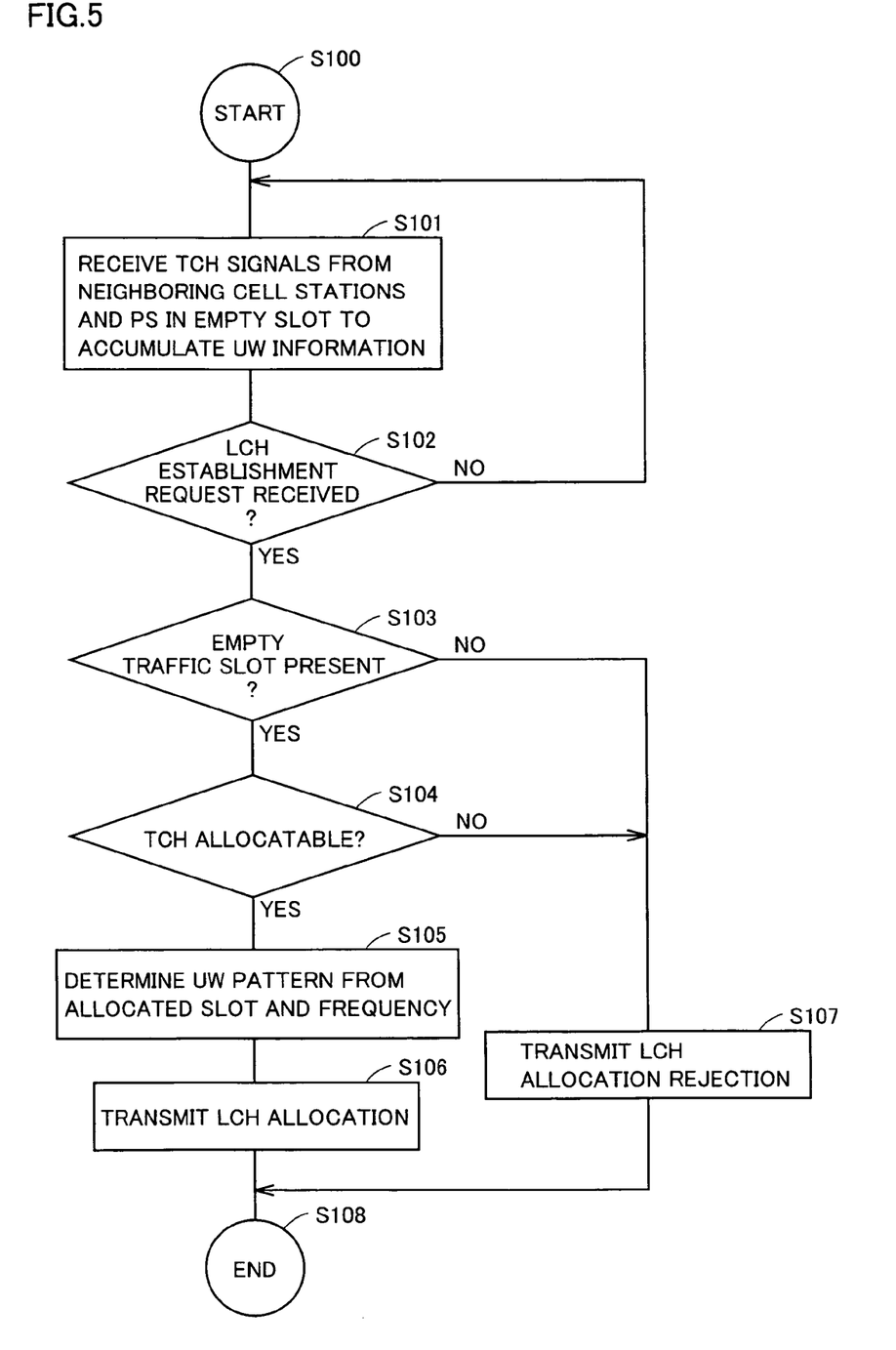
FIG. 5 is a flowchart illustrating an operation of the first embodiment that is performed for allocation of unique words by a control unit of the radio cell station.

FIG. 5 is a flowchart illustrating an operation of the first embodiment that is performed for allocation of unique words by control unit 40 of the radio cell station apparatus in FIG. 1.

Figure 8:
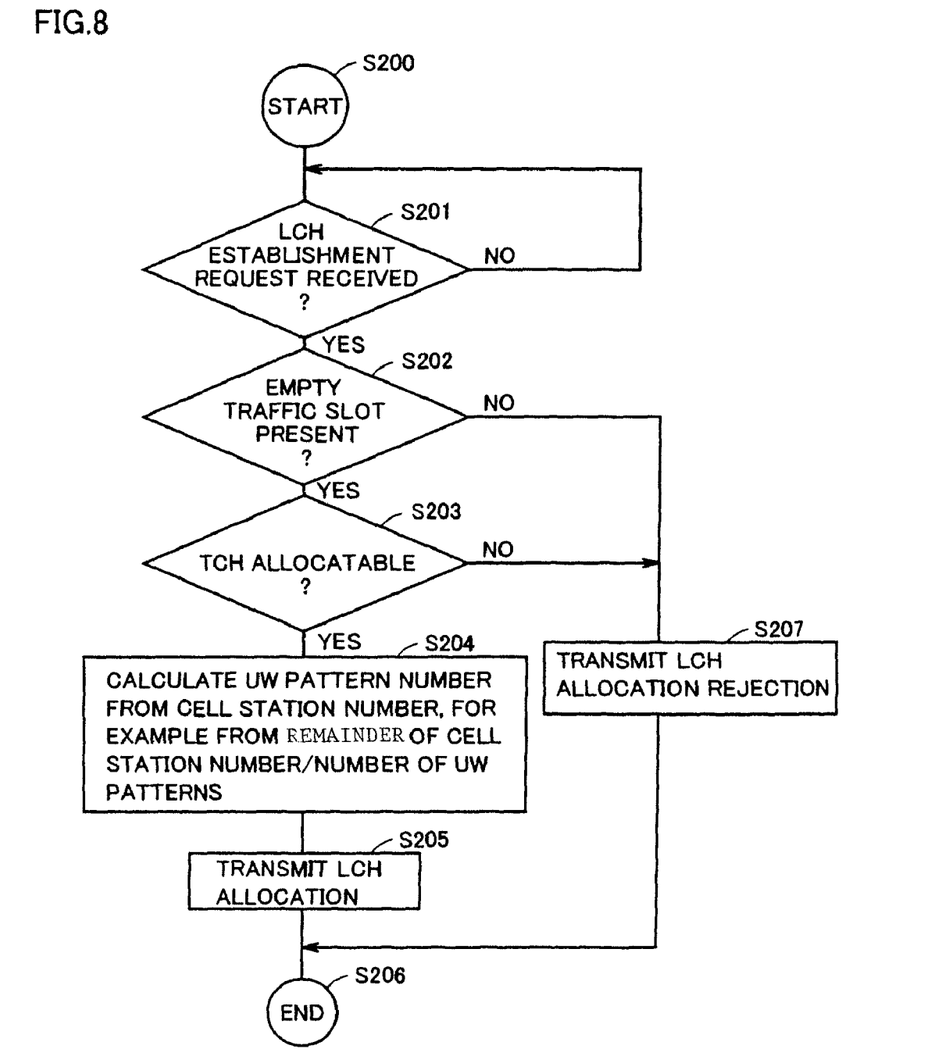
FIG. 8 is a flowchart illustrating an operation of the second embodiment that is performed for allocation of unique words by the control unit of the radio cell station.

The configuration in the functional block diagram of the cell station shown in FIG. 1 is executed in software in accordance with the flowcharts shown in FIGS. 5 and 8, actually by a not-shown digital signal processor (DSP). The DSP reads a program including each step in the flowcharts shown in FIGS. 5 and 8 from a not-shown memory and executes the same. The program can be downloaded from a center (not shown) through a not-shown circuit control unit and a public network.

Referring to FIG. 5, control unit 40 in the CS of FIG. 1 initially searches for information about unique words used for each slot by neighboring CSs, and accumulates the information in storage unit 70 (step S110).

Then, control unit 40 determines whether or not a link channel (LCH) establishment request is made by any user PS of the cell station (step S102).

When the LCH establishment request is not received, control unit 40 returns to step S101 to search for unique word information of neighboring CSs until the LCH establishment request is made and updates as required the information accumulated in storage unit 70.

When the LCH establishment request is received, control unit 40 determines whether or not there is an empty traffic slot (step S103).

In step S103, when there is an empty traffic slot, it is then determined whether or not a traffic channel (TCH) can be allocated (step S104).

When no empty traffic slot is present, a link channel allocation rejection is transmitted (step S107).

In step S104, when it is determined that the traffic channel can be allocated, then, a unique word pattern to be allocated is determined from the traffic slot to be allocated and the frequency to be used (step S105).

At this time, control unit 40 refers to unique word patterns of neighboring CSs accumulated in storage unit 70 to select an unused unique word pattern.

Finally, information about notification of the LCH allocation including the value of the selected unique word is transmitted to the PS making the LCH allocation request (step S106), and the allocation is completed (step S108).

In step S104, when it is determined that the traffic channel (TCH) cannot be allocated, an LCH allocation rejection is transmitted to the PS (step S107).

Figure 6:
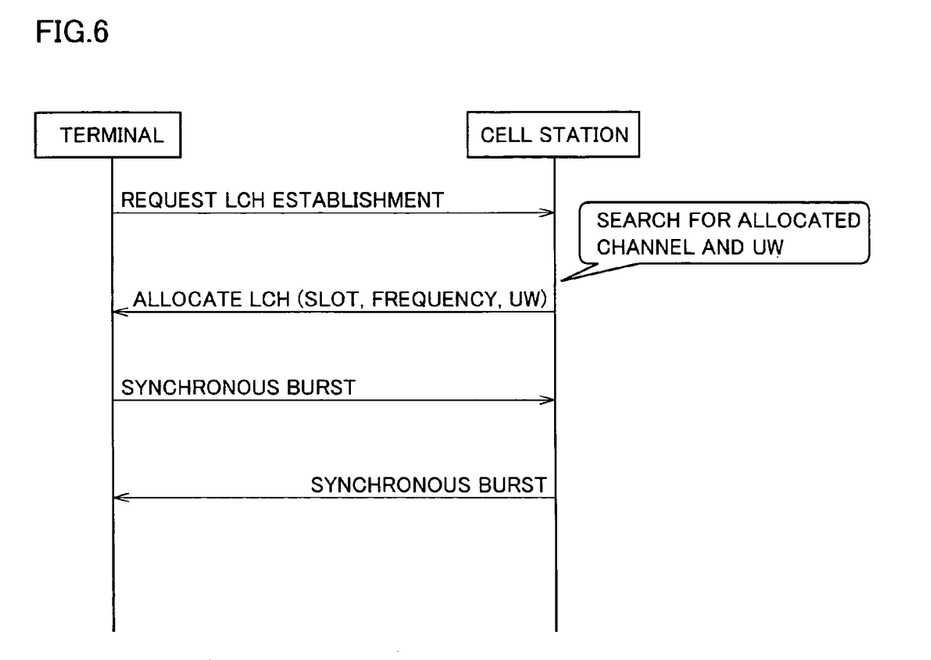
FIG. 6 generally shows a sequence of link channel establishment between a CS and a PS according to the first embodiment.

FIG. 6 generally shows a sequence of link channel establishment between a CS and a PS according to the first embodiment.

Referring to FIG. 6, receiving a link channel (LCH) establishment request from the PS, the CS carries out the operation shown in FIG. 5 to detect an empty traffic channel and specify a unique word to be allocated to the PS based on the information about unique words used by neighboring CSs.

Further, the CS provides to the PS that makes the connection request, a notification of the link channel allocation including available slot number, frequency and unique word value.

Then, the PS receiving the notification of the allocation uses the designated information channel to transmit a synchronous burst signal to the CS. Then, the CS returns the synchronous burst signal to the PS. Synchronization is thus established.

As discussed above, according to the first embodiment of the present invention, the CS allocates, to a PS making a connection request, a link channel including a unique word of a pattern different from any unique words having already been used by any neighboring CSs in a traffic slot to be allocated. Thus, interference with user PSs in other cells can be avoided to prevent deterioration in communication quality.

Second Embodiment

Figure 7:
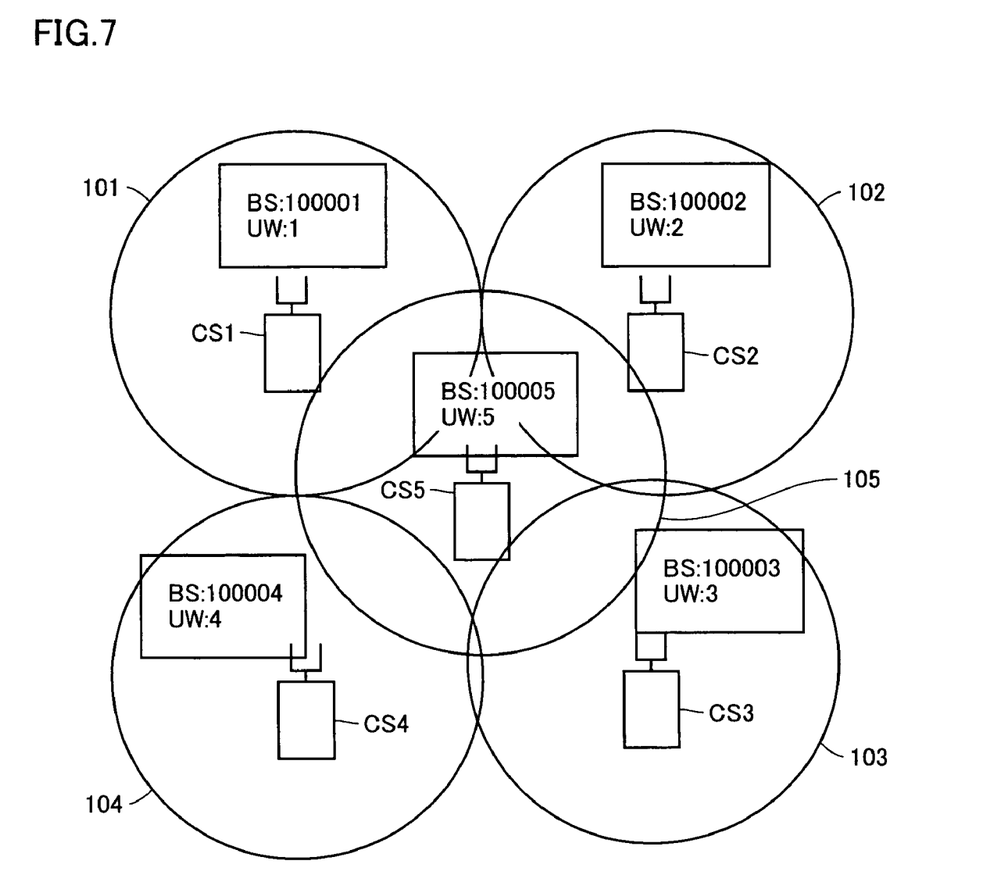
FIG. 7 schematically shows a form in which a plurality of PSs are connected for each of CSs.

FIG. 7 schematically shows a form in which a plurality of PSs are connected for each of CSs.

A method of allocating a unique word by a radio cell station apparatus of a second embodiment is conceptually described in connection with FIG. 7.

Referring to FIG. 7, like FIG. 4, the boundary in which radio waves from each of cell stations CS1 to CS5 are receivable is indicated by each of concentric circles 101 to 105 having the CS at the center. In FIG. 7, because of a high density of cell stations, concentric circles 101 to 105 overlap each other.

It is noted that, in circles 101 to 105 each, a plurality of user PSs are located and connected at a predetermined frequency of the CS in respective time slots.

Here, the radio cell station apparatus of the second embodiment differs from the radio cell station apparatus of the first embodiment in that respective CSs of the second embodiment have cell station numbers (BS) different from each other.

For example, CS1 has its cell station number of "100001" and CS2 has its cell station number of "100002".

Thus, a unique word associated with the cell station number may be determined in advance to avoid coincidence between unique words of difference cell stations.

As an example, in FIG. 7, to cell stations CS1 to CS5, respective cell station numbers and associated unique word numbers are provided respectively. Here, the unique word number is uniquely determined as a value corresponding to the remainder of 15 division of the cell station number by the total number (8 for example) of unique word patterns held in storage unit 70 in FIG. 1.

Accordingly, since CS1 has its cell station number of "100001", the unique word to be allocated is unique word number 1 corresponding to "1" which is the remainder of division of the cell station number by 8.

Similarly, CS2 having its cell station number of "100002," is given a unique word corresponding to unique word number 2, and CS3 having its cell station number of "100003" is given a unique word corresponding to unique word number 3.

Namely, respective CSs have respective unique words different from each other. Search for unique words used by neighboring CSs as conducted in the first embodiment is thus unnecessary, and mutual interference with user PSs in other cells can be prevented.

FIG. 8 is a flowchart illustrating an operation of the second embodiment that is performed by control unit 40 of the radio cell station in FIG. 1.

Referring to FIG. 8, initially control unit 40 determines whether or not a user PS of the cell station makes a link channel (LCH) establishment request (step S201).

Then, when the LCH establishment request is received, control unit 40 determines whether or not there is an empty traffic slot (step S202).

When the empty traffic slot is present in step S202, it is then determined whether or not a link cannel can be allocated for the traffic channel (TCH) (step S203).

When the empty traffic channel is not present, a link channel allocation rejection is transmitted (step S207). It is noted that, when it is determined that the link channel cannot be allocated for the traffic channel as well, the link channel allocation rejection is transmitted (step S207).

When it is determined in step S203 that the traffic channel can be allocated, a unique word pattern to be allocated is determined from a cell station number (step S204). For example, as shown in FIG. 6, the unique word number to be allocated may be specified based on the value of the remainder of division of the cell station number by the total number of unique word patterns stored in storage unit 70.

Finally, the value of the unique word specified in step S204 is included in information about notification of LCH allocation that is transmitted to the PS making the LCH allocation request (step S205), and the allocation is completed (step S206).

When it is determined that the TCH cannot be allocated, an LCH allocation rejection is transmitted to the PS (step S207).

As discussed above, according to the second embodiment of the present invention, the allocated unique word is different from any unique words used by any neighboring CSs and accordingly interference with users in other cells is reduced and communication quality can be ensured.

Further, since a unique word to be allocated is specified independently by CSs each based on the cell station number assigned to each cell station, it is unnecessary to search for and store unique words used by neighboring CSs. Accordingly, the allocation of unique words is simplified and the circuit scale of the storage unit can be reduced.

It is noted that the techniques disclosed in the first and second embodiments are not limited to the SDMA system and the TDMA system and are applicable to all access systems performing transmission and reception between a terminal and a cell station by the time-division method.

As heretofore discussed, according to an aspect of the present invention, the CS allocates, to a PS making a connection request, a link channel including a unique word that is different from any unique word values having already been used by any neighboring CSs in a traffic slot to be allocated. Thus, interference with user PSs in other cells can be avoided to prevent deterioration in communication quality.

Further, according to another aspect of the present invention, an allocated unique word is different from any unique words used by any neighboring CSs and accordingly interference with users in other cells is reduced and communication quality can be ensured.

Furthermore, since a unique word to be allocated is specified independently by CSs each based on the cell station number, it is unnecessary to search for and store unique words used by neighboring CSs. Accordingly, the allocation of unique words is simplified and the circuit scale of the storage unit can be reduced.

INDUSTRIAL APPLICABILITY

It is thus seen from the above that the radio cell station apparatus, the reference signal allocation method and the reference signal allocation program of the present invention can avoid mutual interference between PSs in adjacent cells, and accordingly are useful for a mobile communication system allowing a plurality of users to share a radio transmission path.

The invention claimed is:

1. A radio cell station apparatus in a mobile communication system, signals transmitted/received in said mobile communication system including already-known reference signals, comprising:
   storage means for storing a plurality of reference signals sent along a radio frequency different from each other, wherein a cell station number is assigned to each cell station; and
   reference signal allocation means for, when a connection request is received from a terminal device at a cell station assigned a receiving cell station number, allocating an i-th reference signal corresponding to value i of a remainder of division of said receiving cell station number by total number m of reference signals stored in said storage means, where m is a natural number and i is a natural number of at most m.

2. A reference signal allocation method performed by a radio cell station apparatus in a mobile communication system, signals transmitted/received in said mobile communication system including already-known reference signals, comprising the steps of:
   storing a plurality of reference signals sent along a radio frequency different from each other, wherein a cell station number is assigned to each cell station; and
   allocating, when a connection request is received from a terminal device at a cell station assigned a receiving cell station number, an i-th reference signal corresponding to value i of a remainder of division of said receiving cell station number by total number m of said reference signals stored, where m is a natural number and i is a natural number of at most m.

3. A tangible computer readable medium containing program code which, when executed, causes a radio cell station apparatus in a mobile communication system to execute a reference signal allocation method, signals transmitted/received in said mobile communication system including already-known reference signals, comprising:
   program code for storing a plurality of reference signals sent along a radio frequency different from each other, wherein a cell station number is assigned to each cell station; and
   program code for allocating, when a connection request is received from a terminal device at a cell station assigned a receiving cell station number, an i-th reference signal corresponding to value i of a remainder of division of said receiving cell station number by total number m of said reference signals stored, where m is a natural number and i is a natural number of at most m.

4. A radio cell station apparatus in a mobile communication system, signals transmitted/received in said mobile communication system including already-known reference signals, comprising:
   a storage unit configured to store a plurality of reference signals sent along a radio frequency different from each other, wherein a cell station number is assigned to each cell station; and
   a reference signal allocation unit configured to allocate, when a connection request is received from a terminal device at a cell station assigned a receiving cell station number, an i-th reference signal corresponding to value i of a remainder of division of said receiving cell station number by total number m of reference signals stored in said storage unit, where m is a natural number and i is a natural number of at most m.

* * * * *